Figure 1:
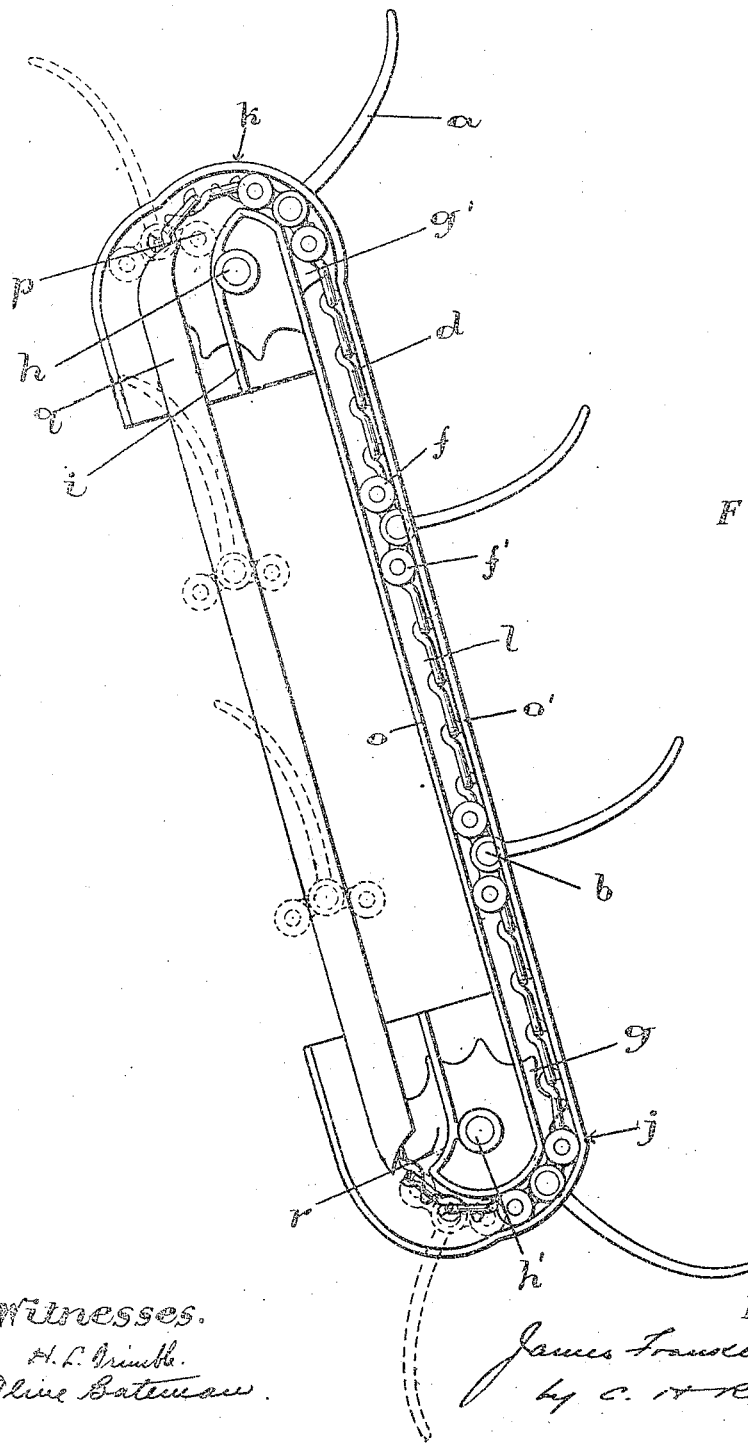

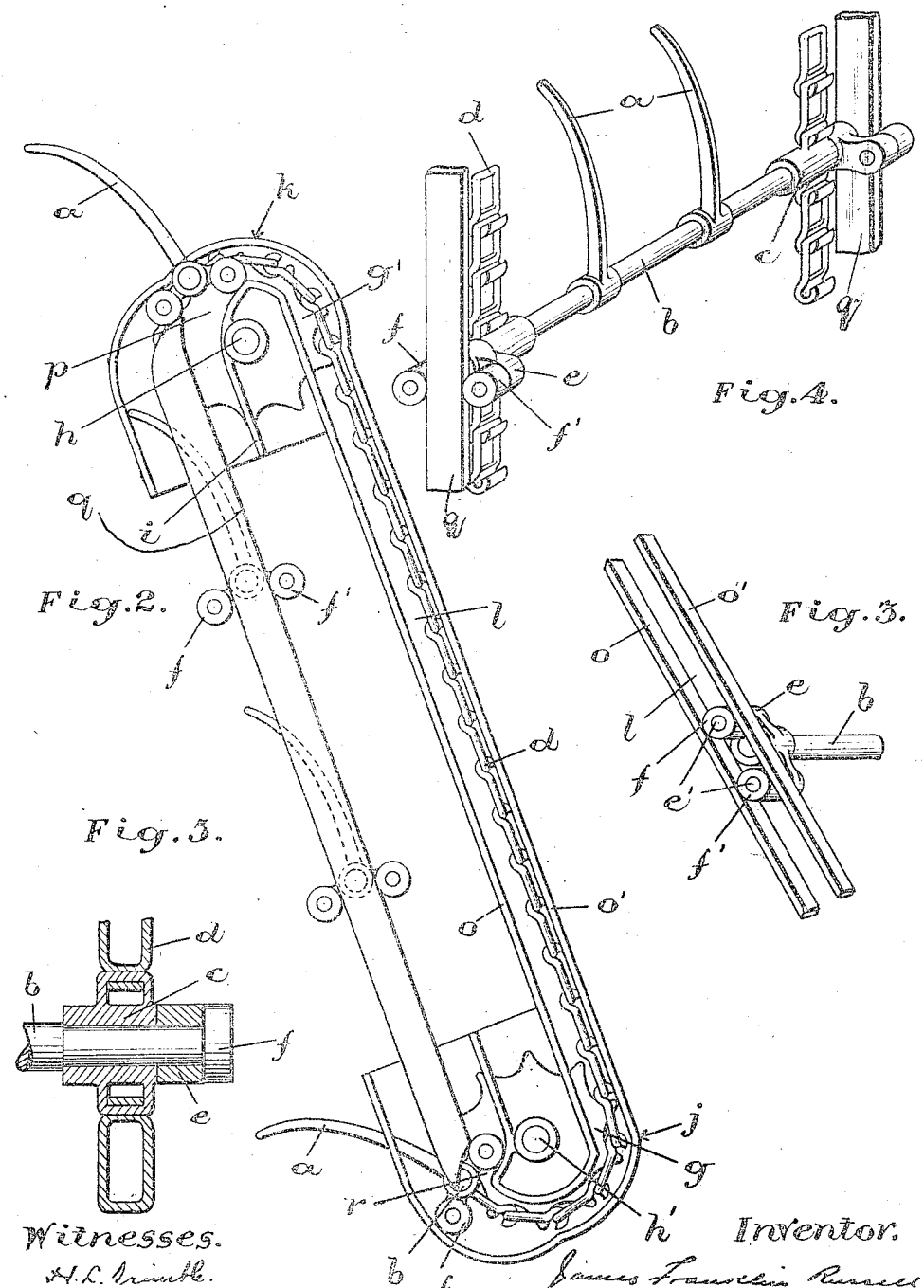

UNITED STATES PATENT OFFICE.

JAMES FRANKLIN RUSSELL, OF WOODSTOCK, ONTARIO, CANADA, ASSIGNOR TO SARAH ELIZABETH RUSSELL, OF HAMILTON, ONTARIO, CANADA.

CONVEYER.

975,721. Specification of Letters Patent. Patented Nov. 15, 1910.

Application filed August 28, 1909. Serial No. 515,118.

*To all whom it may concern:*

Be it known that I, JAMES FRANKLIN RUSSELL, of the city of Woodstock, in the county of Oxford and Province of Ontario, Canada, have invented certain new and useful Improvements in Conveyers; and I hereby declare that the following is a full, clear, and exact description of the same.

This invention relates to an endless conveyer or elevator in which the conveyer or elevator fingers are maintained, in angular relation to the surface along which they are traveling from the place of loading to the place of delivery, so as to have operative relation with the load, and, in substantially parallel relation with the surface along which they are traveling, from the place of delivery to a place near where the load is received, so that they will, at the place of delivery, quickly recede and disengage themselves from the load, as hereinafter set forth and particularly pointed out in the claim.

For an understanding of the invention reference is to be had to the following description and to the accompanying drawings in which:

Figure 1, is a vertical section showing the position of the conveyer or elevator fingers as they travel from the place of loading to the place of delivery. Fig. 2, is a similar view to Fig. 1, showing the position of the fingers as they travel from the place of delivery to the place of loading. Fig. 3, is a perspective view of part of one of the guide ways showing the position of the guide rollers when the fingers are traveling in the direction shown in Fig. 1. Fig. 4, is a perspective view showing the position of the fingers when traveling in the direction shown in Fig. 2. Fig. 5, is a cross sectional view showing the journal link, and the shaft with the bracket for the guide rollers mounted on the end thereof.

Like characters of reference refer to like parts throughout the specification and drawings.

The traveling shafts $b$ are mounted to turn freely in the journal links $c$ of the endless chains $d$, and fixed on the shafts $b$ between each pair of journal links are the conveyer or elevator fingers $a$. On the outer sides of the journal links are forked brackets $e$, integral with, shrunk, keyed, or otherwise rigidly fastened to the shafts $b$, each of the brackets $e$ being provided with two forks $e'$ having mounted thereon guide rollers $f$ $f'$ engaging with the guide ways hereinafter described.

The endless chains $d$ travel around sprocket wheels $g$ $g'$ mounted on the shafts $h'$ $h$, journaled in the main frame $i$. When the fingers $a$ are traveling from the loading place $j$ toward the delivery place $k$, the guide rollers $f$ $f'$ are contained in the guide way $l$, consisting of two parallel guide members $o$ $o'$ separated by an unoccupied space of substantially the same width as the diameter of the guide rollers, to hold each pair of guide rollers in line lengthwise as they travel therein. The fingers $a$ are so secured to the shafts $b$ that, when the guide rollers are in line, they will be angularly disposed to the surface along which they are traveling and in operative relation with the load they are conveying.

The ends of the guide ways $l$ are curved and of slightly greater width than the straight part so that the position of the guide rollers can change when the shafts $b$ are traveling around the sprocket wheels $g$ $g'$. The upper or delivery ends of the guide ways $l$ allow the guide rollers $f$ $f'$, the shafts $b$, and fingers $a$, to turn one-fourth of a revolution as the journal links pass over the sprocket wheels $g'$ bringing the fingers into a position at substantially right angles to their position when ascending to the upper end of the guideways, the cams $p$ then engaging the guide rollers and holding the parts in that position until the pointed upper ends of the guides $q$ enter between the rollers $f$ $f'$. The guide rollers $f$ $f'$ then straddle the guides $q$ with the guide rollers $f$ passing down the outer, and the guide rollers $f'$ passing down the inner, side of the guides. The guide rollers $f$ $f'$ then move abreast along the guides $q$ as they travel from the place of delivery toward the loading place (see Fig. 2) the guides $q$ maintaining the fingers in substantially parallel relation with the surface along which they are traveling.

When the guide rollers reach the lower or loading end of the guides $q$ their relative position is changed by cams $r$ engaging and retarding the rollers $f'$ until the rollers $f$ have moved ahead and effected the turning of the brackets $e$ shafts $b$ and fingers $a$, the remaining three-quarters of their revolution, thus bringing the fingers again into angular relation with the surface along which they are moving to receive the sheaves as they are delivered from the binder deck and carry them to the top of the elevator where they can be delivered by the recession of the fingers without being forcibly projected from the elevator, the guide rollers $f'$ when clear of the cams $r$ following in rear of the guide rollers $f$.

The conveyer or elevator is designed for conveying bound sheaves, loose straw such as corn, grain, hay, and manure, or boxes, sacks, packages or the like, and by having the fingers travel as above described, it is possible to maintain them in a rigid condition while they are carrying their load, and in a flexible condition when they are returning to the loading place, the flexibility depending upon the relative width of the guide ways $q$, to the space between the guide rollers $f\ f'$.

Having thus fully described my invention what I claim as new and desire to secure by Letters Patent is:

The hereinbefore described device comprising two endless chains, said chains having journal links forming part thereof, shafts mounted to turn in the journal links having forked ends with guide rollers thereon, conveyer fingers fixed on the shafts, and two sets of guide ways engaging the guide rollers, one set of guide ways consisting of parallel guides engaging the guide rollers and holding them in line lengthwise to maintain the conveyer fingers at an angle to the surface along which they are moving, and the other set of guide ways consisting of single rails arranged to enter between the guide rollers and cause them to travel abreast, maintaining the conveyer fingers in substantially parallel relation with the surface along which they are then moving, cams at one end of the guideways to turn the guide rollers shafts and fingers one-fourth of a revolution to bring them into parallel relation, and cams at the other end of the guide ways to turn the same parts three-fourths of a revolution and bring them into angular relation, with the surface along which they are traveling.

Woodstock, August 13th 1909.

JAMES FRANKLIN RUSSELL.

Signed in the presence of—
  J. G. WALLACE,
  C. H. RICHES.